(No Model.) 2 Sheets—Sheet 1.

C. E. HOLLEY.
VEHICLE RUNNING GEAR.

No. 505,548. Patented Sept. 26, 1893.

Witnesses
C. A. Ford
N. J. Riley

Inventor
Clarence E. Holley.
By his Attorneys,
C. A. Snow & Co.

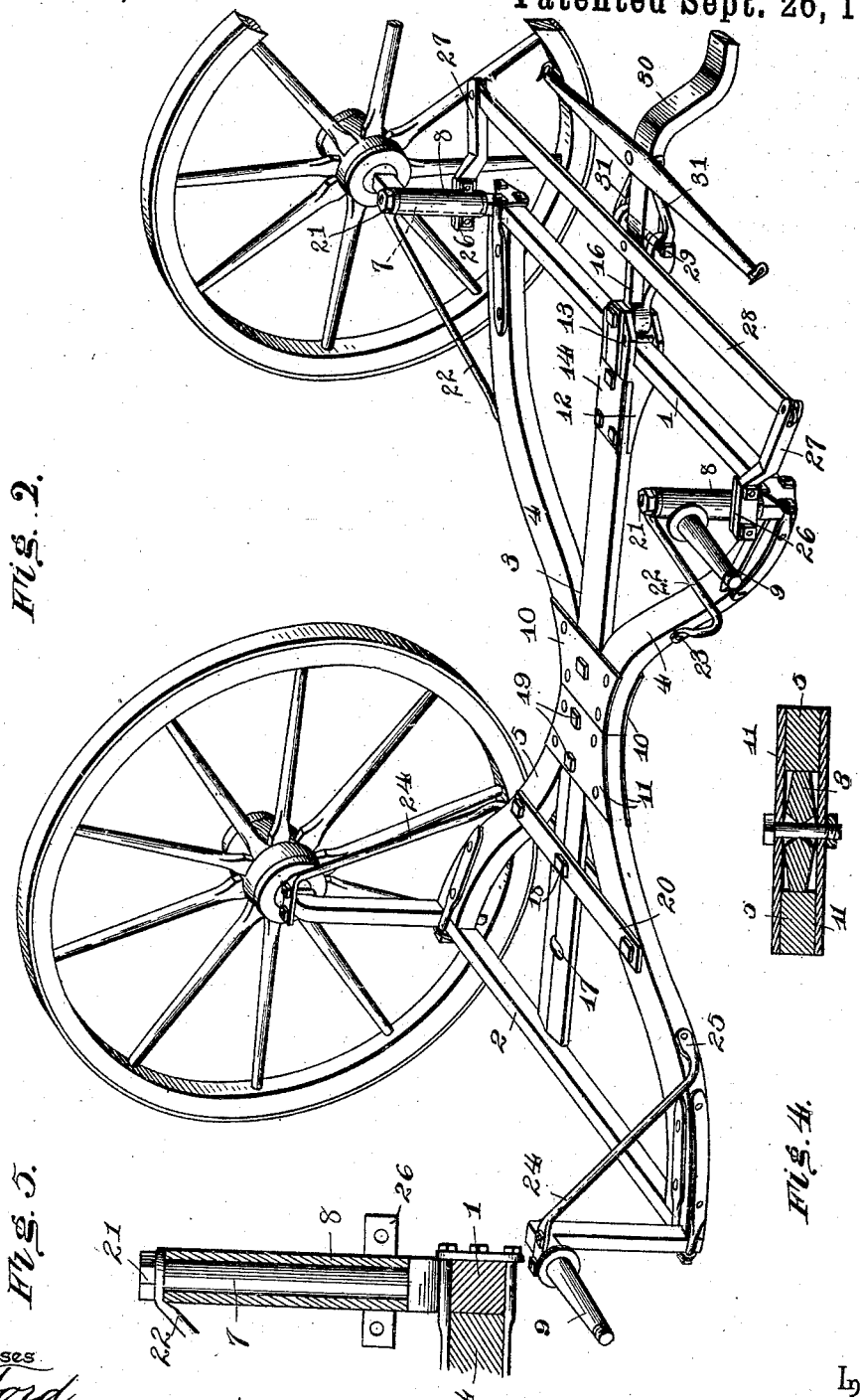

UNITED STATES PATENT OFFICE.

CLARENCE E. HOLLEY, OF PRESQUE ISLE, MAINE.

VEHICLE RUNNING-GEAR.

SPECIFICATION forming part of Letters Patent No. 505,548, dated September 26, 1893.

Application filed February 13, 1893. Serial No. 462,087. (No model.)

*To all whom it may concern:*

Be it known that I, CLARENCE E. HOLLEY, a citizen of the United States, residing at Presque Isle, in the county of Aroostook and State of Maine, have invented a new and useful Vehicle, of which the following is a specification.

The invention relates to improvements in vehicles.

The object of the present invention is to improve the construction of drop or crank axle farm or truck vehicles, to enable the platform or body to be readily removed to permit the running gear to be employed for other purposes, and to enable the brake to be readily applied.

The invention consists in the construction and novel combination and arrangement of parts hereinafter fully described, illustrated in the accompanying drawings and pointed out in the claims hereto appended.

Figure 1:
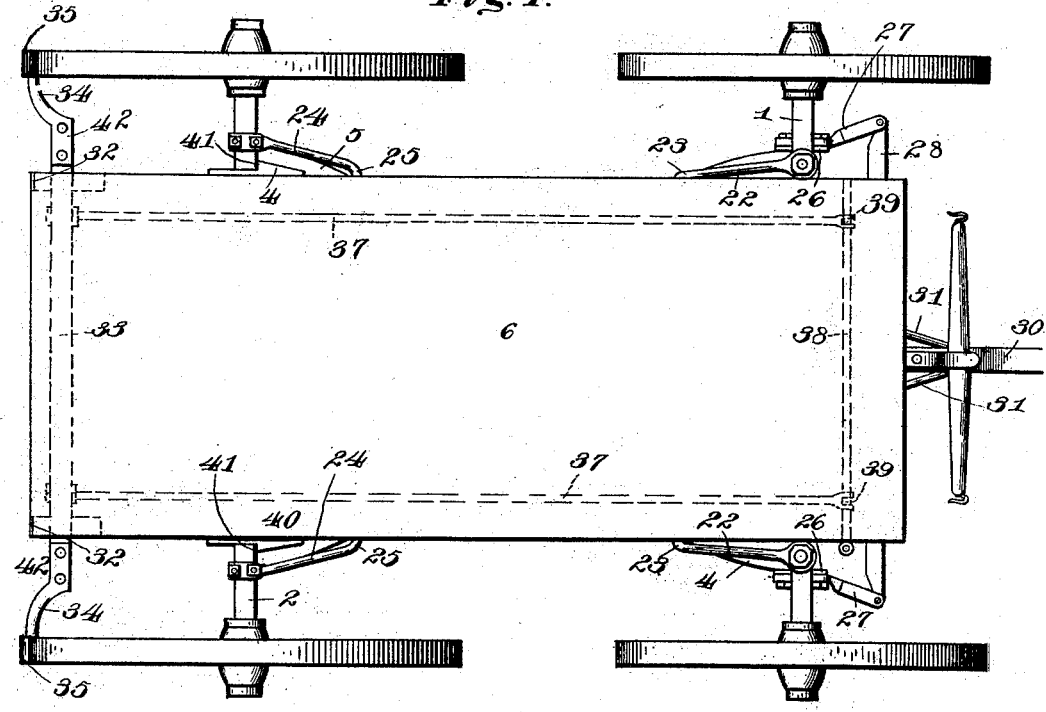
Figure 3:
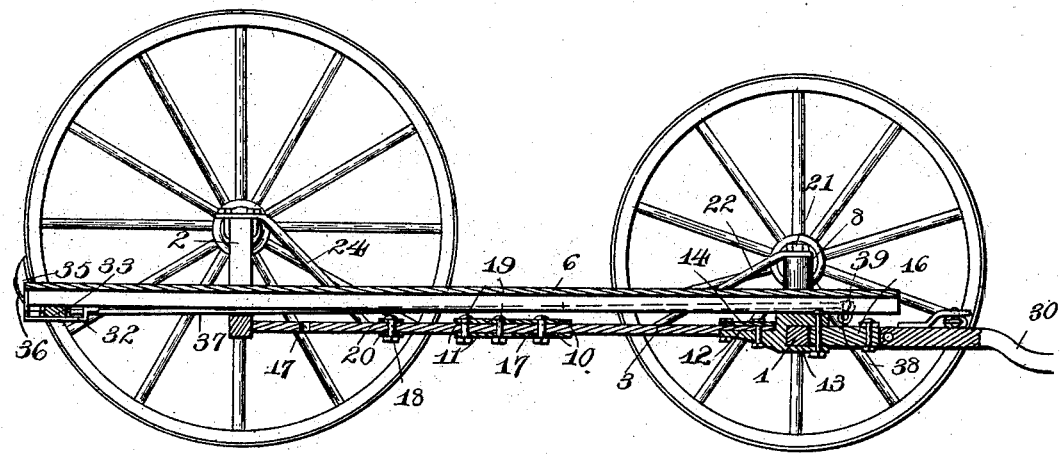

In the drawings—Figure 1 is a plan view of a vehicle embodying the invention. Fig. 2 is a perspective view of the running gear, the platform being removed. Fig. 3 is a longitudinal sectional view of the vehicle as shown in Fig. 1. Fig. 4 is a detail sectional view showing the manner of securing the reach between the rear hound. Fig. 5 is a detail sectional view of the front axle.

Like numerals of reference indicate corresponding parts in all the figures of the drawings.

1 and 2 designate front and rear crank or drop axles, connected by a reach 3 and front and rear hounds 4 and 5, and supporting a removable platform 6, adapted to be taken off to permit the running gear to be employed for hauling poles and other things at which time it is not desirable to have a platform or body to the vehicle. The front axle is provided with vertical spindles 7, which receive sleeves 8 of horizontal axle spindles 9. The rear axle is constructed of a single piece of metal, and wheels are journaled on the spindles proper of the front and rear axles.

The front hounds have their forward ends clipped to the front axle at the base of the vertical spindles thereof, and their rear ends are connected by upper and lower plates 10, between which is arranged the reach. The rear hounds have their rear ends secured to the hind axle and their front ends connected by upper and lower plates 11, which receive the reach. The front end of the reach 3 is bolted to a rearwardly extending plate or flange 12 of a casing 13, and a plate 14 is arranged on the upper face of the front end of the reach. The casing has a horizontal opening extending rearward from its front end and is bolted to the front axle, and has pivotally secured in its open front end a horizontally swinging draft iron 16. The rear portion of the reach is oppositely beveled and gradually tapers in thickness from its middle to its longitudinal edges and is provided with a series of adjusting perforations 17, adapted for the reception of pins or bolts 18 and 19, which pass through the plates 11 and crossbars 20 secured to the upper and lower faces of the rear hounds. The perforations 17 are transversely elongated and are flared or countersunk at the ends, whereby the reach will have a limited rocking or twisting movement in its bearings on the rear hounds and the cross-bars 20, which movement is facilitated by the tapering rear portion of the reach and which permits the vehicle to pass freely over rough and uneven roads.

The upper ends of the vertical spindles of the front axle are threaded and provided with nuts 21, which secure the upper ends of inclined braces 22 to the tops of the vertical spindles. The front inclined braces 22 extend downward and rearward and have their rear ends 23 curved inward and secured to the outer edges of the front hounds. The rear axle is supported by similar braces 24, which have their upper ends clipped to the horizontal spindle portion of the rear axle adjacent to the vertical arms, and the front ends 25 of the rear braces are curved inward and secured to the outer faces of the rear hounds.

The sleeves 8 of the front axle are provided at the outer sides with perforated ears 26, and bolted to the latter are forwardly extending angle-arms 27, which have their front ends bifurcated and pivotally connected to a shifting cross-bar 28 pivoted at its center to the horizontally swinging draft iron 16. The draft iron 16 is provided at its front end with oppositely disposed eyes, which receive a horizontal pin 29 of a tongue 30, whereby the latter is connected with the vehicle. The horizontal pin 29 is supported at its ends by divergent metal arms 31 of the tongue, secured at their front ends to the latter, and having their rear ends arranged at the outer sides of the eyes of the draft iron. When the tongue is moved to the right or left the front wheels of the vehicle are turned accordingly, by means of the shifting cross-bar, which is connected with the sleeves of the horizontal wheel spindles.

The removable platform 6 extends forward and rearward beyond the axles of the running gear, and is provided on its lower face at its rear end with keepers 32, and arranged in the latter is a brake-bar 33, which terminates short of the hind wheels, and is provided at its ends with rearwardly and outwardly curved arms 34 carrying brake-shoes 35. The brake-shoes 35 are secured to the front faces of depending plates 36 formed integral with the curved arms, and the latter by extending outward and rearward from the brake-bar enable the brake-shoes to be arranged in rear of the hind wheels without extending the platform too far rearward. If the platform were extended too far rearward of the hind axle a heavy weight being placed on the rear portion would raise the front portion of the platform and make the vehicle inoperative. The brake-bar 33 is connected near the sides of the platform by rods 37 with a rock-shaft 38 located at the front of the platform. The rock-shaft is provided with arms 39 to which the connecting rods are pivoted, and is provided at one end with a lever or handle by which the brake is operated. The platform is provided at each side near its rear end with stop plates 40 provided with shoulders 41 which fit against the front faces of the vertical arms of the rear axle and prevent the platform moving rearward when the brakes are applied. The curved arms at the ends of the brake-bar are provided with integral flat plates 42 which are secured to the upper faces of the brake-bar.

Changes in the form, proportion and the minor details of construction may be resorted to without departing from the principle or sacrificing any of the advantages of this invention.

What I claim is—

1. In a drop or crank axle farm or truck wagon, the combination of front and rear axles, the front and rear hounds, upper and lower plates secured to the adjacent ends of the hounds, a reach secured to the front axle and having its rear portion tapered toward its edges and provided with transversely enlarged perforations, whereby the rear axle is permitted a limited rocking movement, and a bolt passing through the plates of the rear hounds and arranged in one of the perforations of the reach, substantially as and for the purpose described.

2. In a drop or crank axle farm or truck wagon, the combination of front and rear axles, the front and rear hounds secured to the axle, the upper and lower plates connecting the adjacent ends of the hounds, cross-bars connecting the rear hounds, the reach connected with the front axle and having its rear portion tapered toward its longitudinal edges and provided with enlarged perforations having tapering or countersunk ends, whereby a limited rocking movement is permitted and bolts passing through the cross-bars and the plates of the rear hounds and arranged in perforations of the reach, substantially as and for the purpose described.

3. In a drop or crank axle farm or truck wagon, the combination of the front and rear crank axles, wheels, a removable platform mounted on the axles and provided at its rear end with keepers, a brake-bar arranged in the keepers and terminating short of the wheels, rearwardly and outwardly curved arms secured to the ends of the brake-bar and carrying brake-shoes arranged in rear of the hind wheels, and means for actuating the brake-bar for applying the brake, substantially as described.

4. In a drop or crank axle farm or truck wagon, the combination of the front and rear crank axles, wheels, the removable platform mounted on the axles and provided near their rear ends at opposite sides with plates having shoulders fitting against the front faces of the rear axle, keepers arranged on the platform at the rear end thereof, a brake bar arranged in the keepers and terminating short of the wheels, the rearwardly and outwardly curved arms secured to the brake-bar and carrying brake-shoes arranged in rear of the hind wheels, and a rock-shaft arranged at the front of the platform and provided with a handle or lever and connected with the brake-bar, substantially as described.

5. In a drop or crank axle farm or truck wagon, the combination of the front and rear crank axles, the front axle being provided with vertical spindles and having horizontal wheel spindles with sleeves arranged on the vertical spindles, front and rear hounds, a reach, the inclined braces extending from the hounds to the top of the axles, ears arranged on the outer face of said sleeves, forwardly extending angle arms secured to the sleeves by bolts passing through the ears thereof, a casing secured to the front axle and receiving the front end of the reach, a shifting cross-bar pivotally connected to the front ends of the angle arms, a swinging draft-iron pivoted in the casing and connected with the cross-bar and provided with forwardly extending eyes, and a tongue having a horizontal pin arranged in said eyes and provided with divergent arms supporting the pin, substantially as described.

6. In a drop or crank axle farm or truck wagon, the combination of the front and rear drop axles, wheels, and a removable platform mounted on the axles and extending forward beyond the front axle and provided with stops to engage the rear axle, substantially as described.

In testimony that I claim the foregoing as my own I have hereto affixed my signature in the presence of two witnesses.

CLARENCE E. HOLLEY.

Witnesses:
J. G. HILT,
J. S. HODGDON.